United States Patent [19]

Brindöpke et al.

[11] Patent Number: 4,657,962

[45] Date of Patent: Apr. 14, 1987

[54] FINELY DIVIDED COATING AGENT CONTAINING POLYMERS HAVING HYDROXYL GROUPS AND BLOCKED POLYISOCYANATES CONTAINING AT LEAST ONE ACYLURETHANE

[75] Inventors: Gerhard Brindöpke, Frankfurt am Main; Gerhard Johannes, Taunusstein, both of Fed. Rep. of Germany

[73] Assignee: Hoechst AK, Fed. Rep. of Germany

[21] Appl. No.: 741,864

[22] Filed: Jun. 6, 1985

[30] Foreign Application Priority Data

Jun. 8, 1984 [DE] Fed. Rep. of Germany ....... 3421294

[51] Int. Cl.⁴ ............................................. C08G 18/80
[52] U.S. Cl. .................................... 524/362; 428/417; 428/418; 428/419; 428/423.1; 428/425.1; 428/425.6; 428/425.8; 525/124; 525/440; 525/452; 525/453; 525/454; 525/455; 525/459; 525/460; 528/45
[58] Field of Search ............... 525/454, 455, 452, 453, 525/124, 440, 459, 460; 524/362; 528/45; 428/417, 418, 419, 423.1, 425.1, 425.6, 425.8

[56] References Cited

U.S. PATENT DOCUMENTS

| | | | |
|---|---|---|---|
| 4,355,058 | 10/1982 | Gras et al. | 528/45 |
| 4,395,529 | 7/1983 | Panandiker et al. | 528/45 |
| 4,500,696 | 2/1985 | Gras | 528/45 |

*Primary Examiner*—Maurice J. Welsh
*Attorney, Agent, or Firm*—Bierman & Muserlian

[57] ABSTRACT

Finely divided coating agents based on (A) oligomers and/or polymers containing OH groups and (B) blocked polyisocyanates and, if required, further conventional additives, in which the component (B) contains at least one acylurethane possessing groups of the formula —CO—NH—CO—$XR^1$ (I), wherein X represents oxygen or nitrogen, and, when X is oxygen, $R^1$ represents alkyl, alkoxyalkyl, hydroxyalkyl, aryl, aralkyl or cycloalkyl, and, when X is nitrogen, the radical $XR^1$ represents the group

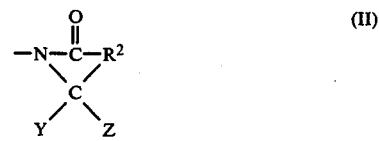
(II)

wherein $R^2$ is $C_{1-11}$-alkylene, $C_{1-11}$-alkenylene, or unsubstituted or alkyl-substituted phenylene having up to 8 carbon atoms in the alkyl radical, and Y and Z together form an oxygen atom, or are identical or different and each denote hydrogen or $C_{1-5}$-alkyl, the coating agent being present in powder form or in the form of a dispersion. The coating agent is used for coating articles exposed to weather, and as top coats and primers.

16 Claims, No Drawings

FINELY DIVIDED COATING AGENT CONTAINING POLYMERS HAVING HYDROXYL GROUPS AND BLOCKED POLYISOCYANATES CONTAINING AT LEAST ONE ACYLURETHANE

The preparation of powder surface coatings having a long shelf life from epoxy resins containing OH groups and isophorone diisocyanate adducts blocked with ε-caprolactam has already been described (German Offenlegungsschrift No. 2,945,113).

Another publication describes the use of very reactive, blocked polyisocyanates, prepared by reacting ε-caprolactam with adducts of isophorone diisocyanate and polyols together with polyesters containing OH groups, for the preparation of powder surface coatings (German Offenlegungsschrift No. 3,004,876).

As indicated in one of the publications, isophorone diisocyanate blocked with ε-caprolactam has the disadvantage that a powder prepared from it cakes during storage.

German Patent No. 2,547,124 proposes heat-curable resin mixtures based on a saturated polyester containing OH groups and a polyacyl-N compound, for example sebacoylbis-caprolactam, which are used for powder coatings.

However, none of the abovementioned caprolactam compounds contains the group —CO—NH—CO—.

On the other hand, it is known that acyl and aroyl carbamates can be prepared by reacting carbamates with acyl or aroyl halides of monocarboxylic acids in the presence of metals and metal compounds (German Auslegeschrift No. 2,225,247). Nothing is stated in connection with the use of the products.

According to another publication, acylurethanes which contain the group —CO—NH—COOR$^2$, wherein R$^2$ denotes alkyl, cycloalkyl, aryl or aralkyl, and which have been prepared from urethanes and acyl chlorides of monobasic to tribasic carboxylic acids are used as acylating agents for hydroxy and amino compounds (German Patent No. 1,081,460).

This publication mentions that the acylation process is suitable for use in the chemistry of plastics, in textile finishing and in surface coatings, and that the cross-linked resins can be used as ion exchangers. No further information is given there in connection with surface coatings; it is merely stated that most of the acylated urethanes described are soluble in the conventional organic solvents, i.e. those preferably used in the surface coating industry. However, the publication makes no statement concerning the use of the acylated urethanes in powder surface coatings and/or pastes, although it is known that the components have their own special characteristics in this field of use.

It was desirable to prepare a finely divided coating agent for use in powder surface coatings and pastes or dispersions, which avoids the stated difficulties, has high reactivity on the one hand but, on the other hand, can be exposed for a short time to temperatures of 100° to 120° C. during its preparation without undesired cross-linking taking place, and which nevertheless has an excellent shelf life of several weeks or months.

The invention therefore relates to a finely divided coating agent based on A) oligomers and/or polymers containing OH groups and B) blocked polyisocyanates, wherein the component B) contains at least one acylurethane possessing groups of the formula —CO—NH—CO—XR$^1$ (I), wherein X represents oxygen or nitrogen, and, when X is oxygen, R$^1$ represents alkyl, alkoxyalkyl, hydroxyalkyl, aryl, aralkyl or cycloalkyl having 1 to 12, preferably 1 to 8, carbon atoms in the alkyl group, and, when X is nitrogen, the radical XR$^1$ represents the group

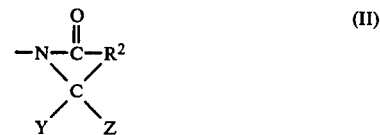

wherein
R$^2$ is C$_{1-11}$-alkylene, preferably C$_{1-8}$-alkylene, C$_{1-11}$-alkenylene, unsubstituted or alkyl-substituted phenylene having up to 8 carbon atoms in the alkyl radical, and
Y and Z together form an oxygen atom, or are identical or different and each denote hydrogen or C$_{1-5}$-alkyl, and the coating agent is present in powder form or in the form of a dispersion.

Where Y and Z have a meaning other than oxygen, R$^2$ is, as a rule, a C$_{1-11}$-alkylene, preferably having at least 2 carbon atoms.

The coating agent according to the invention permits reliable processing. Thus, for example, components A) and B) can be mixed at elevated temperature without a premature undesired crosslinking reaction beginning. It is therefore quite possible to expose the mixture of the components to temperatures of up to about 150° C., for example 100° to 120° C., without crosslinking occurring. However, the use of high temperatures is dependent on the apparatus employed and the residence time. Furthermore, the mixture can be stored over a period of several months at room temperature without its reactivity being adversely affected. Caking does not occur. On the other hand, the mixture surprisingly cures at relatively low temperatures with the formation of a smooth, perfectly level coating. This reactivity is due in particular to the acylurethane group of the formula I, which is associated with double activation.

Preferably, the component A) contains at least one oligomer and/or polymer from the group comprising polyesters, polyacryl compounds and polyepoxides. However, it is also possible to employ, as the component containing OH groups, polyethers, polythioethers, polyacetals, polyester-amides, phenol resins, amine resins and products obtained by modifying these with polyfunctional alcohols, for example melamine resins or urea resins, and thiourea resins; polyurethanes, polysulfonamides, cellulose esters and cellulose ethers, partially hydrolyzed homo- and copolymers of vinyl esters, partially acetalated polyvinyl alcohols and the like. These polymers or oligomers containing hydroxyl groups can have melting points of, for example, 65° to 130° C., preferably 75° to 100° C. In some cases, the melting points may also be higher. It is also possible to employ mixtures of the stated compounds if these are compatible with one another, for example mixtures of polyesters and epoxy resins.

Suitable polyesters are the known, commercial saturated and/or unsaturated, optionally halide-substituted polyesters, as well as polyesters containing cycloaliphatic and aromatic components, or polyesters which may contain ether groups and/or monofunctional components, for example monocarboxylic acids or monohydric alcohols, in minor amounts, such as oil-modified polyesters, for example in the form of alkyd resins. In general, the polyesters have an OH number of 30 to 200, preferably 40 to 150.

The following may be mentioned as examples of essential components of the polyesters:
(a) aliphatic and cyclic polycarboxylic acids, saturated or ethylenically unsaturated and having in each case up to 15 carbon atoms, such as adipic acid, sebacic acid, maleic acid and fumaric acid or their anhydrides, where these exist, phthalic acid, its tetra- and hexahydroderivatives, isophthalic acid, terephthalic acid, trimellitic acid, naphthalene dicarboxylic acid or the like;
(b) polyhydric alcohols, such as ethylene glycol, $C_{3-8}$diols, their oligomers, cyclohexanediol, glycerol, neopentylglycol, pentaerythritol, trimethylolethane and -propane or the like.

Examples of suitable polyepoxides, which have an epoxide equivalent weight of 450 to 5,000, preferably 700 to 2,000, are solid epoxy resins based on diphenylolpropane or -methane and epichlorohydrin or adducts of other epoxides, such as ethylene oxide, propylene oxide, butylene oxide, trimethylene oxide, styrene oxide or the like, with polyhydric alcohols, amines or hydroxyalkylated phenols, provided that these polyepoxides still possess free OH groups, as well as glycidyl esters or ethers which have free OH groups and can be prepared, for example, from glycidyl esters of saturated or ethylenically unsaturated carboxylic acids, each having 3 to 12 carbon atoms.

Examples of suitable acrylic resins are homo- and copolymers of a hydroxyalkyl acrylate and/or a hydroxyalkyl methacrylate, in particular containing an alkyl acrylate and an alkyl methacylate, each having up to 8 carbon atoms in the alkyl radical, acrylic and methacrylic acid, acrylonitrile, methacrylonitrile, acrylamide, methacrylamide, styrene, fumarates, maleates and other copolymerizable monomers, if desired individually or as a mixture in each case. These compounds have an average molecular weight of 800 to 20,000, preferably 1,000 to 15,000, in particular 2,000 to 12,000, and an OH number of 50 to 200, in particular 80 to 160.

Preferably, the compound B) used as a crosslinking agent is a compound of the formula

$$R-(-CO-NH-CO-XR^1)_n \quad (III)$$

wherein
R denotes the hydrocarbon radical of an optionally $\alpha,\beta$-ethylenically unsaturated aliphatic, araliphatic or carbocyclic polycarboxylic acid which has 1 to 20, preferably up to 12 carbon atoms and optionally can contain ester, ether, thioether and/or amide groups,
$R^1$ and X have the abovementioned meaning, X preferably being oxygen, and
n is an integer from 2 to 4, preferably 2.

Acids which may be mentioned as polybasic acids which form the radical R are, for example, aliphatic saturated or $\alpha,\beta$-ethylenically unsaturated acids, such as malonic acid, succinic acid, adipic acid, suberic acid, sebacic acid, decanedicarboxylic acid and dodecanedicarboxylic acid, acids containing hetero atoms, such as diglycolic acid; maleic acid and fumaric acid; aromatic acids, such as phthalic acid, terephthalic acid, isophthalic acid, trimellitic acid, pyromellitic acid and benzylidenedicarboxylic acid; cycloaliphatic acids, such as hexahydrophthalic acid, tetrahydrophthalic acid and their endoalkylene derivatives, and methylcyclohexenetricarboxylic acid; and heterocyclic acids, such as tri-N-ethylenecarboxytriisocyanurate, individually or as a mixture in each case. In general, the aliphatic carboxylic acids are preferred. Polycarboxylic acids are also understood as meaning those compounds which represent esters of a polyhydric alcohol and a dibasic or polybasic carboxylic acid and which still possess at least two free COOH groups, for example the ester of 1 mole of ethanediol or hexanediol and 2 moles of maleic acid, phthalic acid or succinic acid. The radical R can thus also contain ester groups or ether, thioether and/or amide groups. It may be advantageous here if the curing component B) has a melting point of at least 60° C., preferably at least 80° C., in order to ensure satisfactory processing, for example comminution of the mass.

However, it is also possible for R to represent the radical of a polycarboxylic partial ester which may, if appropriate, furthermore be etherified. Examples of suitable partial esters are alkyl or alkoxyalkyl esters of the acids mentioned for R, having up to 12, preferably up to 6, carbon atoms in the alkyl radical in each case.

The component B) can be prepared, for example, in a manner which is known per se or according to the process described in German Patent Application No. P 34 21 293.0 ("Process for the preparation of acylurethanes and their use", submitted on the same day).

Examples of suitable alcohols which form the radical $-XR^1$ in formula (III) are monohydric or polyhydric alcohols having 1 to 12 carbon atoms, such as methanol, ethanol, the propanols, butanols, pentanols, hexanols, octanols and decanols, their homologs and their methyl, ethyl, propyl and butyl ethers and their partial esters, for example those having up to 12 carbon atoms in the acid component, or the like.

The radicals $-XR^1$ are eliminated during baking. The components B) in which $XR^1$ is an alcohol radical are usually preferred because these substances cause particularly little pollution during the baking process. In some cases, however, it may also be desirable to choose compounds in which X is nitrogen.

These compounds, which thus possess the radical $-NR^1$, i.e. contain the group of the formula (II) wherein Y and Z denote hydrogen or alkyl, are preferably pyrrolidone, lauryllactam and $\epsilon$-caprolactam.

In a further embodiment of the invention, the component B) contains the radical of the formula (II) wherein Y and Z together denote an oxygen atom, so that the formula

$$\quad (IV)$$

results. Examples of compounds which form the radical (IV) are imides, for example those of succinic acid and phthalic acid.

In some cases, it may also be desirable for the coating agents according to the invention to contain not only the polyacylurethanes but also monoacylurethanes, these being present, as a rule, in a minor amount of up to 20 or 10%, relative to the polyacylurethanes. These monofunctional compounds can be used, for example, to vary the crosslinking density of the system. They are particularly preferably used in the case of systems having a high crosslinking density. In most cases, however, polyacylurethanes alone are employed.

In general, the component B) has a softening point of 40° to 240° C., preferably 80° to 200° C. The reliability of the mixture during processing, the baking temperature and the physical properties of the applied coating can be controlled within certain limits through the choice of the softening point.

The ratio of amounts of components A) to B) depends in general on the amount of OH groups in component A) and the number of acylurethane groups of the formula I in component B) per OH group. As a rule, the components are employed in, for example, about a stoichiometric ratio, but it is also possible to use an excess of one or other component. Hence, the ratio of the OH groups of component A) to the number of acylurethane groups of component B) is in general (0.5 to 1.3):1 to 1:(0.5 to 1.3), preferably (0.8 to 1):1 to 1:(0.8 to 1).

Preferably, the coating agent according to the invention additionally contains a small amount of benzoin and/or its o-, m- or p-alkyl substitution products having up to 8 carbon atoms in the alkyl group, but preferably benzoin itself. The amount of benzoin compound is in general 0.1 to 10, preferably 0.2 to 5, % by weight, relative to the solids content of the mixture. The presence of the component B) together with this substance which inhibits bubble formation and pore formation surprisingly helps to produce a particularly smooth, substantially improved surface of the coatings in comparison with the coatings produced from conventional powder surface coatings. This surprising and advantageous effect is due in particular to the advantageous flow properties in the crosslinking reaction between the OH groups and the acylurethane during baking. Within certain limits, the flow properties can be varied with the chain length of component B). As a result of the advantageous flow and the good pigment wetting, the coating agents according to the invention can be used to produce relatively thin coatings which still possess an adequate hiding power. Surprisingly, a substantial amount of material is therefore saved.

Since the component B) of the coating agents according to the invention predominantly contains urethane groups, only compounds possessing alcoholic groups are liberated during baking, so that this process takes place in general without causing pollution. There is thus no pollution of the environment, nor can any substances be precipitated in the processing apparatuses.

In addition to the stated components, the coating agents according to the invention can contain further conventional additives, such as catalysts, pigments, fillers, levelling agents, wetting agents, gloss products, stabilizers or the like, individually or as a mixture in each case.

Examples of levelling agents are polyacrylates, such as poly-n-butyl acrylate and poly-2-ethylhexyl acrylate, and cellulose acetobutyrate.

In order to employ particularly low temperatures during curing, if necessary at least one curing catalyst from the group comprising sulfonic acids, such as p-toluenesulfonic acid and naphthalene-1,4-disulfonic acid, quaternary ammonium salts, such as tetrabutylammonium bromide and the corresponding chloride and iodide, aminohydrochlorides, such as dimethylaniline hydrochloride, metal salts of organic acids, such as zinc naphthenates, cobalt naphthenate, dibutyl-tin dilaurate and lithium benzoate, metal alcoholates, for example those of titanium, vanadium and zirconium and their coordination complexes, such as acetylacetate, ethyl acetoacetate, etc, and alkali metal compounds, such as hydroxides of lithium, sodium and potassium, and alkali metal salts, such as lithium chloride, may be present.

These catalysts are employed in general in an amount of 0.01 to 5, preferably 0.1 to 0.5, % by weight, relative to the total solids content of the mixture.

Examples of pigments which can be used are titanium dioxide, iron oxide and carbon black. Suitable fillers include calcium carbonate and barium sulfate.

To prepare the coating agents according to the invention, the components required for this are mixed, and the mixture is comminuted in a conventional manner in a comminuting apparatus which is known per se. Depending on the desired form of the coating agent, i.e. as a powder or dispersion, different methods are used.

If it is desired to produce, for example, a pulverulent coating agent, the mixture can be mixed and extruded in, for example, a conventional heatable extruder at elevated temperature, for example at 100° to 120° C. Pulverization can be carried out by, for example, milling in a hammer mill, a pinned disk mill, an air jet mill or an air separation ball mill or the like.

If, on the other hand, a coating agent in the form of a dispersion is desired, comminuting is carried out using, for example, vibrating mill or impeller braker or the like, and, if necessary, wet milling on appropriate units may also be effected in order to keep the temperature as low as possible. In this procedure, water is preferably employed as the liquid phase.

For the preparation of a dispersion, the components, in particular components A) and B), must be hydrophobic, in order to avoid undesired preliminary reactions which can take place in partially water-soluble systems and lead to problems. When used in dispersions, the coating agent is homogenized in either water or a water-soluble binder, such as a polyester or its reaction products with oils, which possess, for example, carboxyl groups and can subsequently be rendered water-soluble with compounds containing amino groups. The solids content of such a dispersion is in general 1 to 80, preferably 10-75, % by weight.

To prepare the powder surface coatings, the finished mill base is generally sieved, and the particles having a particle size of less than 120 $\mu$m are separated off. The particle size of the powder surface coating is therefore up to 120 $\mu$m, preferably up to 90 $\mu$m and in particular 30 to 50 $\mu$m. In the case of coating agents in the form of a dispersion, the particle size is likewise not more than 120 $\mu$m, preferably not more than 15 $\mu$m, in particular not more than 5 $\mu$m. The powder obtained has an excellent shelf life, does not cake even when stored for several months at temperatures up to 40° C., and shows no tendency at all to undergo crosslinking when heated to 120° C.

The coating agent is applied onto a substrate in a conventional manner by electroless methods of application, such as spraying, dipping, flooding or coil-coating, or by the electrostatic spray method, in particular onto metal components, for example iron or aluminum sheet. A dispersion used in this procedure has a solids content of, for example, 20 to 80, preferably 40 to 75, % by weight.

If it is intended to apply the coating agent according to the invention in the form of a dispersion, it is preferable to employ the electrophoretic powder coating method as described in, for example, European Patent No. 00 43 104. The electrocoating procedure is usually carried out in an aqueous bath, the substrate being connected as the cathode.

The coating agents can be applied, for example, onto chemically pretreated or degreased, unprimed or primed metals, as well as onto glass and ceramics.

The solids content and the pH of the dispersion are brought to the desired value, the pH being dependent on the polarity in the electrochemical deposition procedure. In general, the solids content of the bath in the electrocoating method is 1 to 30, preferably 10 to 15, % by weight. However, it may also be higher. Electrocoating is carried out, for example, until a film of the desired thickness has been deposited onto the workpiece serving as the opposite pole. Thereafter, the coated workpiece is removed from the bath, rinsed with water and then baked in a conventional manner.

The coating agents according to the invention can be applied by the various methods in general in a layer thickness of at least 5 μm, preferably from 30 to 100 μm, in particular 40 to 60 μm. In some cases, however, about 200 μm or more can also be achieved.

Among the stated methods of application, the electrostatic spray method, coil-coating and electrocoating are preferred.

The baking temperature for the coating agent is as a rule 140° to 300° C., preferably 150° to 200° C., in particular 160° to 180° C., the temperature being dependent on the duration of baking. Thus, for example, a low temperature requires a longer baking time, whilst the baking time at high temperatures can be extremely short. The maximum temperatures of 300° C. are reached for a short time, particularly in the coil-coating method, without having an adverse effect on the properties of the resulting coatings. This method, too, gives satisfactory surfaces. In specific cases, the coated workpiece can also be preheated to a temperature of 50° to 100° C. for a few minutes. As a rule, however, this is unnecessary because of the excellent curing properties of the coating agents according to the invention.

The non-pollutant cleavage products produced during baking, and the excellent adhesion of the coatings to the substrate, constitute a surprising effect and a substantial technical advance compared with the processes known to date.

Furthermore, the flow of the present coating agents is substantially better compared with the conventional powder surface coating systems, even those based on polyurethanes. Another advantage of the coating agents according to the invention is that, for example in contrast to epoxy resins and epoxy resin/polyester systems, they are extraordinarily stable to light and heat, and even to irradiation by light of short wavelength. Surprisingly, in combination with polyesters and/or acrylic resins, no yellowing results even after heating to 100° C. for 2,000 hours.

Owing to their advantageous properties, the coating agents according to the invention are used for a variety of purposes on a wide range of substrates, such as metal, wood, plastics, glass, etc, for example for coating articles exposed to weather, such as facade surfacing, window frames, metal profiles and camping furniture, as top coats and primers for commercial vehicles, such as automobiles, agricultural machinery and motor cycle bodywork, and for household appliances, such as refrigerators, washing machines, electric cookers or the like.

In the experiments and examples below, P denotes parts by weight, and % denotes % by weight.

EXAMPLES

I Component A (a) Polyesters

The polyester components A) listed in Table 1 are polyesters of different composition and OH number.

1. Oil-free, saturated polyester containing hydroxyl groups and having an OH number of 50, known under the tradename "Alftalat ® AN 739".
2. Saturated polyester containing hydroxyl groups and having an OH number of 110, known under the tradename "Alftalat VAN 1242".

The polyesters I to III are each mixtures of the stated commercial products having different OH numbers.

| Polyester I | OH number 55 |
| Polyester II | OH number 70 |
| Polyester III | OH number 100. |

(b) Polyacrylate resin

A polyacrylate resin prepared by mass polymerization of dimethyl maleate, styrene, methyl methacrylate and 2-hydroxyethyl methacrylate at 170° C., and having the following characteristic data, was employed as the further compound of component A: OH number 140, melt viscosity at 160° C.: 13,000 mPa.s.

II Preparation of component B 1. 80 p of decanedicarboxylic acid dichloride and 55 p of ethyl carbamate in 300 p of dichloroethane were heated under reflux with 2 p of zinc chloride for 6 hours. After the mixture had been cooled to room temperature, the precipitate was filtered off under suction and washed with 100 p of diethyl ether. Yield: 94.4 p of a white crystalline compound of melting point 154° C.

2 24 p of sebacic acid dichloride and 25 p of 2-methoxyethyl carbamate in 300 p of gasolene (boiling range 60° to 90° C.) were reacted with 1 p of zinc chloride analogously to Experiment 1. Yield: 34 p of a white crystalline powder of melting point 130° C.

3. 24 p of sebacic acid dichloride and 19 p of ethyl carbamate in 300 ml of gasolene were reacted with 1.5 p of p-toluenesulfonic acid analogously to Experiment 1. Yield: 33 p of a white powder of melting point 155° C.

4. 183 p of adipic acid dichloride and 244 p of 2-methoxyethyl carbamate in 1 l of dichloroethane were reacted with 5 p of zinc chloride analogously to Experiment 1. Yield: 330 p of a white powder of melting point 174° C.

5. 18.3 p of adipic acid dichloride and 36 p of 2-ethylhexyl carbamate in 250 p of gasolene were reacted with 2 p of p-toluenesulfonic acid analogously to Experiment 1. Yield: 37 p of a compound of melting point 105° C.

6. 31 p of ethylene glycol, 100 p of succinic anhydride and 0.5 p of triethylamine were heated to 80° C. Stirring was continued at 80° C. until the theoretical acid number of 430 was reached, and the mixture was then cooled to 50° C. Thereafter, 134 p of thionyl chloride were added dropwise in the course of 1½ hours, and stirring was continued until the evolution of gas had ended. 600 p of dichloromethane, 130 p of methyl carbamate and 3 p of zinc chloride were then added at room temperature, the mixture was heated under reflux for 6 hours and cooled, and the precipitate was then filtered off under suction. Yield: 110 p of a white crystalline powder of melting point 184° C.

Comparative component BV

A commercial isophorone diisocyanate blocked with ε-caprolactam, having a melting point of 90° to 110° C. and containing 14% of blocked isocyanate groups and 0.5% of free isocyanate groups was used as the comparative substance.

III. Examples 1 to 8 and Comparative Experiments V 1 to V 3

Table 1 gives an overview of the composition of the different examples of the pulverulent coating agents according to the invention, arranged according to the OH numbers of the components A). The stated numerical values are the number of parts by weight of the substances employed in each case.

Comparative Experiments V 1 to V 3 were carried out using the abovementioned comparative component B V and one of the polyesters I to III. Comparative Experiment V 4 was carried out using the same polyacrylyl compound as in Example 8 and the comparative component B V.

IV. Testing of coatings

Tables 2 and 3 show the physical properties of the coatings according to Table 1 obtained under various baking conditions. The values according to Table 2 were obtained after curing for 20 minutes at 170° C., and those of Table 3 after curing for 15 minutes at 180° C. The impact test was carried out in accordance with ASTM D 2794-69. The values for the levelness were determined by visual assessment, 0 being the best value and 5 the poorest value (DIN No. 53,230).

TABLE 1

| OH number | 55 | | | | 70 | | | 100 | | | 140 | |
|---|---|---|---|---|---|---|---|---|---|---|---|---|
| Example or Comparison V | 1 | 2 | 3 | V1 | 4 | 5 | V2 | 6 | 7 | V3 | 8 | V |
| Component A: | | | | | | | | | | | | |
| Component A 1 | 515 | 509 | 521 | 471 | 365 | 354 | 323 | 83 | 84 | 72 | — | — |
| Component A 2 | 47 | 46 | 47 | 43 | 182 | 177 | 161 | 416 | 423 | 361 | — | — |
| polyester I* | 562 | 555 | 568 | 514 | — | — | — | — | — | — | — | — |
| polyester II* | — | — | — | — | 547 | 531 | 484 | — | — | — | — | — |
| polyester III* | — | — | — | — | — | — | — | 493 | 501 | 433 | — | — |
| ( ) | — | — | — | — | — | — | — | — | — | — | 431 | 369 |
| Component B: | | | | | | | | | | | | |
| Component B 1 | 103 | — | — | — | — | — | — | 166 | — | — | — | — |
| Component B 2 | — | 110 | — | — | — | 134 | — | — | — | — | 214 | — |
| Component B 3 | — | — | — | — | 118 | — | — | — | — | — | — | — |
| Component B 4 | — | — | 97 | — | — | — | — | — | 158 | — | — | — |
| Comparison B V | — | — | — | 151 | — | — | 181 | — | — | 232 | — | 276 |
| Titanium dioxide | 300 | 300 | 300 | 300 | 300 | 300 | 300 | 300 | 300 | 300 | 350 | 350 |
| Levelling agent (polyacrylate) | 30 | 30 | 30 | 30 | 30 | 30 | 30 | 30 | 30 | 30 | — | — |
| benzoin | 5 | 5 | 5 | 5 | 5 | 5 | 5 | 5 | 5 | 5 | 5 | 5 |
| | 1000 | 1000 | 1000 | 1000 | 1000 | 1000 | 1000 | 1000 | 1000 | 1000 | 1000 | 1000 |

*The figures for the polyesters correspond to the sum of the two Alftalat grades mentioned above.

TABLE 2

Curing for 20 minutes at 170° C. (zinc-phosphatized iron sheet)

| Example or Comparison V | 1 | 2 | 3 | V1 | 4 | 5 | V2 | 6 | 7 | V3 | 8 | V |
|---|---|---|---|---|---|---|---|---|---|---|---|---|
| Erichsen deep-drawing value mm | 11 | 10.5 | 10 | 3 | 11 | 11 | 10 | 10 | 11 | 10 | 9 | <1 |
| Reverse impact test inch. pound | >100 | >100 | >100 | <20 | >100 | >100 | <20 | >100 | >100 | <20 | 24 | <10 |
| Layer thickness μm | 45 | 40 | 45 | 40 | 45 | 60 | 55 | 50 | 50 | 55 | 60 | 55 |
| Gloss according to Lange (60° C.) | 91 | 89 | 90 | 50 | 99 | 100 | 92 | 85 | 82 | 60 | 103 | 90 |
| Levelness | 1 | 1.5 | 1.5 | 2.5 | 1.5 | 1.5 | 2.5 | 1.5 | 2 | 3 | 1 | 2.5 |

TABLE 3

Curing for 15 minutes at 180° C. (zinc-phosphatized iron sheet)

| Example or Comparison V | 1 | 2 | 3 | V1 | 4 | 5 | V2 | 6 | 7 | V3 | 8 | V |
|---|---|---|---|---|---|---|---|---|---|---|---|---|
| Erichsen deep-drawing value mm | 10.4 | 10.8 | 11 | 10.1 | 11 | 11 | 10.8 | 10.5 | 10.8 | 11 | 9.2 | 1.8 |
| Reverse impact test inch. pound | >100 | >100 | >100 | 40 | >100 | >100 | 48 | >100 | >100 | 60 | 24 | <10 |
| Layer thickness μm | 50 | 45 | 50 | 55 | 60 | 55 | 55 | 50 | 55 | 55 | 55 | 55 |
| Gloss according to Lange (60° C.) | 87 | 88 | 85 | 83 | 100 | 100 | 92 | 90 | 70 | 55 | 101 | 89 |
| Levelness | 1 | 1 | 1.5 | 2.5 | 1 | 1.5 | 2.5 | 1.5 | 2 | 2.5 | 1 | 2.5 |

V. Discussion of the results

As shown by the values for the Erichsen deepdrawing value and the impact test, crosslinking of the coatings occurs at a relatively early stage for all of the Examples according to the invention, i.e. surprisingly, the necessary mechanical properties are reached at relatively low temperatures and within short baking times. That this is a surprising effect is shown in particular by the Comparative Experiments V 1 to V 3, in which particularly the values for the impact test are substantially below those according to the invention. Furthermore, the products according to the invention also exhibit better gloss and levelness than the comparative products. This is attributable primarily to the curing component B).

The properties determined according to Example 8 show the low impact test results usually found for the acrylic resins which are brittle per se, but unexpectedly excellent Erichsen deep-drawing values. The surprisingly high value for the gloss should be noted. This is attributable in particular to the good flow properties, the good adhesion and the complete crosslinking due to the acylurethanes.

Comparative Experiment V 4 shows that, in contrast to Example 8, the crosslinking reaction has not yet begun at the curing temperatures of 170° and 180° C., so that all mechanical properties of V 4 are poorer than those of Example 8.

We claim:

1. A finely divided coating agent based on
    (A) oligomers, polymers or a mixture thereof containing OH groups and
    (B) blocked polyisocyanates and optionally further conventional additives, the component B) consisting of at least one acylurethane, possessing groups of the formula —CO—NH—CO—XR$^1$ (I), wherein X represents oxygen or nitrogen, and, when X is oxygen, R$^1$ represents alkyl, alkoxyalkyl, hydroxyalkyl, aryl, aralkyl or cycloalkyl having 1 to 12 carbon atoms in the alkyl group, and, when X is nitrogen, the radical XR$^1$ represents the group

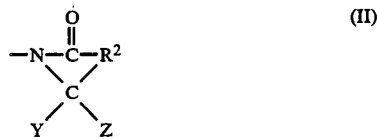

(II)

wherein
   R$^2$ is C$_{1-11}$-alkylene, C$_{1-11}$-alkenylene, or unsubstituted or alkyl-substituted phenylene having up to 8 carbon atoms in the alkyl radical, and
   Y and Z together form an oxygen atom, or are identical or different and each denote hydrogen or C$_{1-5}$-alkyl, and the coating agent is present in powder form or in the form of a dispersion.

2. A coating agent as claimed in claim 1, which contains, as further conventional additives, catalysts, pigments, fillers, levelling agents, wetting agents, gloss products or stabilizers, individually or as a mixture.

3. A coating agent as claimed in claim 1, wherein the component A) contains at least one oligomer, polymer or a mixture thereof selected from the group comprising polyester, polyacrylyl compound and polyepoxide.

4. A coating agent as claimed in claim 1, wherein the component B) represents a compound of the formula

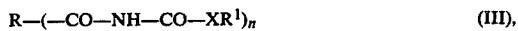

wherein
   R denotes the hydrocarbon radical of an optionally α, β-ethylenically unsaturated aliphatic, araliphatic or carbocyclic polycarboxylic acid which has 1 to 20 carbon atoms and can optionally contain ester, ether, thioether, and amide groups or a mixture thereof,
   X and R$^1$ have the abovementioned meaning and n is an integer from 2 to 4.

5. A coating agent as claimed in claim 1, wherein the component B) has a softening point of 40° to 240° C.

6. A coating agent as claimed in claim 1, wherein the ratio of the OH groups of component A) to the acylurethane groups of component B) is (0.5–1.3):1 to 1:(0.5–1.3).

7. A coating agent as claimed in claim 1 or 2 or 3, which additionally contains benzoin its alkyl substitution products or a mixture thereof, in an amount of 0.1 to 10%, by weight, relative to the total solids content of the mixture.

8. A coating agent as claimed in claim 1, wherein a dispersion has a solids content of from 1 to 80 % based on the total of the coating agent and a particle size of at most 120 μm.

9. A coating agent as claimed in claim 8, wherein the solids content is 10 to 75 % and the particle size is at most 15 μm.

10. A coating agent as claimed in claim 1, wherein the powder form has a particle size of up to 90 μm.

11. A coating agent as claimed in claim 10, wherein the particle size is 30 to 50 μm.

12. Coatings obtained by electrostatic coating, coil-coating or electrocoating of the coating agent as claimed in claim 1 on substrates consisting of metal, wood, plastics or glass.

13. Coatings as claimed in claim 12, wherein the applied coating agent is baked at a temperature of 140° to 300° C.

14. Coatings as claimed in claim 12, wherein the coating is producted in a layer thickness of at least 5 μm.

15. Coatings as claimed in claim 12, on articles exposed to the weather.

16. Coatings as claimed in claim 12 as top coats and primers.

* * * * *